US012605767B2

(12) United States Patent
Storck et al.

(10) Patent No.: US 12,605,767 B2
(45) Date of Patent: Apr. 21, 2026

(54) ADDITIVE MANUFACTURING SYSTEM ASSESSMENT AND CONTROL ADJUSTMENT

(71) Applicant: The Johns Hopkins University, Baltimore, MD (US)

(72) Inventors: Steven M. Storck, Catonsville, MD (US); Mary E. Daffron, Columbia, MD (US); Vincent R. Pagan, Ellicott City, MD (US); Brendan P. Croom, Baltimore, MD (US); Ari M. Lax, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 358 days.

(21) Appl. No.: 18/414,746

(22) Filed: Jan. 17, 2024

(65) Prior Publication Data

US 2024/0408675 A1     Dec. 12, 2024

Related U.S. Application Data

(60) Provisional application No. 63/485,639, filed on Feb. 17, 2023.

(51) Int. Cl.
*B22F 10/366*     (2021.01)
*B22F 10/28*      (2021.01)
                  (Continued)

(52) U.S. Cl.
CPC ............ *B22F 10/366* (2021.01); *B22F 10/28* (2021.01); *B22F 12/41* (2021.01); *B33Y 30/00* (2014.12); *B33Y 50/02* (2014.12)

(58) Field of Classification Search
None
See application file for complete search history.

(56)              References Cited

U.S. PATENT DOCUMENTS

2022/0266531 A1     8/2022   Storck et al.
2022/0324056 A1*   10/2022   Beckett ............... B23K 26/032
                             (Continued)

OTHER PUBLICATIONS

Benedikt Brandau et al., "Angular dependence of coaxial and quasi-coaxial monitoring systems for process radiation analysis in laser materials processing," Optics and Lasers in Engineering 155, 107050, 2022, pp. 1-14.

*Primary Examiner* — Ryan A Jarrett
(74) *Attorney, Agent, or Firm* — Noah J. Hayward

(57)              ABSTRACT

A method for adjusting laser control parameters of a laser additive manufacturing system for construction of a part is provided. The method may include performing a laser scan of a building surface, and detecting spectral and intensity response information indicative of at least a temperature at the building surface. The method may also include correlating the spectral and intensity response information with spatial positioning of the laser during the laser scan to generate spatially-correlated spectral and intensity response information. Additionally, the method may include generating a spatial adjustment mask based on the spatially-correlated spectral and intensity response information and a target spatial intensity profile, applying the spatial adjustment mask to spatially-defined laser control parameters, and controlling the laser to perform an additive manufacturing build operation performed in accordance with the target spatial intensity profile due to application of the spatial adjustment mask to construct the part.

20 Claims, 7 Drawing Sheets

(51) Int. Cl.
    *B22F 12/41*        (2021.01)
    *B33Y 30/00*      (2015.01)
    *B33Y 50/02*      (2015.01)

(56)                References Cited

U.S. PATENT DOCUMENTS

2022/0404209  A1    12/2022  Storck et al.
2023/0234137  A1*   7/2023  Reutzel ................... B22F 10/85
                                    382/141

* cited by examiner

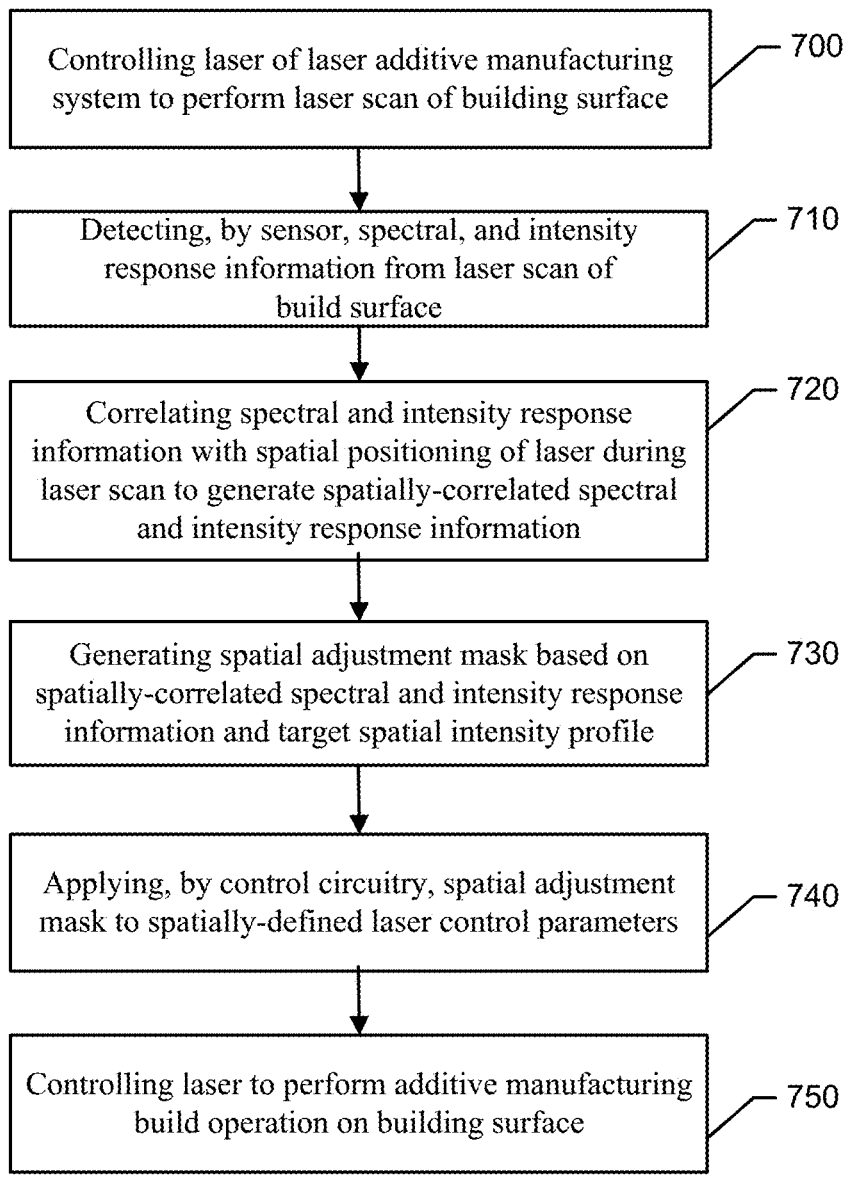

Controlling laser of laser additive manufacturing system to perform laser scan of building surface — 700

Detecting, by sensor, spectral, and intensity response information from laser scan of build surface — 710

Correlating spectral and intensity response information with spatial positioning of laser during laser scan to generate spatially-correlated spectral and intensity response information — 720

Generating spatial adjustment mask based on spatially-correlated spectral and intensity response information and target spatial intensity profile — 730

Applying, by control circuitry, spatial adjustment mask to spatially-defined laser control parameters — 740

Controlling laser to perform additive manufacturing build operation on building surface — 750

FIG. 7

ADDITIVE MANUFACTURING SYSTEM ASSESSMENT AND CONTROL ADJUSTMENT

CROSS-REFERENCE TO RELATED APPLICATIONS

This application claims priority to and the benefit of prior-filed, U.S. Provisional Application No. 63/485,639 filed on Feb. 17, 2023, the entire contents of which are hereby incorporated herein by reference.

STATEMENT OF FEDERALLY SPONSORED RESEARCH OR DEVELOPMENT

This invention was made with Government support under contract number N00014-22-1-2687 awarded by the Office of Naval Research (ONR). The Government has certain rights in the invention.

TECHNICAL FIELD

Example embodiments generally relate to additive manufacturing, and in particular calibration and monitoring of additive manufacturing systems.

BACKGROUND

Additive manufacturing, which can be considered a type of three-dimensional (3D) printing, is useful in a wide variety of applications to construct components such as, for example, new and replacement parts. In many instances, additive manufacturing techniques are superior to many conventional manufacturing techniques due to the ability to construct parts having shapes that could not otherwise be constructed using conventional techniques. Additive manufacturing is often used in the construction of component parts for large complex devices, such as vehicles. For example, in the aviation industry, additive manufacturing techniques have proven to be very useful for manufacturing parts that support flight of an aircraft. Because high stresses and strains may be placed on such aviation part, the parts must be certified for use in the construction of the aircraft and are therefore subject to high scrutiny for strength and quality. As such, it is important to be able to minimize defects and flaws in the parts to ensure that high yield is maintained, even under such high scrutiny.

As such, it is important that additive manufacturing system be consistently operating with high performance. As with many types of equipment, performance can degrade over time leading to sub-par manufacturing. In some instances, for example due to extremely long build times, a degraded operating condition of an additive manufacturing system may not be known until a build is complete and the resulting part must be discarded. As such, there is a need for new ways to assess the operating condition of an additive manufacturing system to minimize lost time and wasted manufacturing materials due to poor performing systems.

BRIEF SUMMARY

According to some non-limiting, example embodiments, a method for adjusting laser control parameters of a laser additive manufacturing system for construction of a part is provided. The example method may include controlling a laser of the laser additive manufacturing system to perform a laser scan of a building surface, and detecting, by a sensor, spectral and intensity response information from the laser scan of the build surface. The spectral and intensity response information may be indicative of at least a temperature at the building surface during the laser scan. The example method may further include correlating the spectral and intensity response information with spatial positioning of the laser during the laser scan to generate spatially-correlated spectral and intensity response information, generating a spatial adjustment mask based on the spatially-correlated spectral and intensity response information and a target spatial intensity profile, and applying, by control circuitry, the spatial adjustment mask to spatially-defined laser control parameters. Further, the example method may include controlling the laser to perform an additive manufacturing build operation to construct the part. In this regard, the additive manufacturing build operation may be performed in accordance with the target spatial intensity profile due to application of the spatial adjustment mask.

According to other non-limiting, example embodiments, a laser additive manufacturing system is provided. The laser additive manufacturing system may include a laser generator configured to generate a laser, a laser movement assembly configured to direct a position of the laser, a sensor configured to detect spectral and intensity response information associated with operation of the laser, and control circuitry. The control circuitry may be configured to control the laser to perform a laser scan of a building surface, and receive, from the sensor, the spectral and intensity response information captured during the laser scan of the build surface. The spectral and intensity response information may be indicative of at least a temperature at the building surface during the laser scan. The control circuitry may be further configured to correlate the spectral and intensity response information with spatial positioning of the laser during the laser scan to generate spatially-correlated spectral and intensity response information, generate a spatial adjustment mask based on the spatially-correlated spectral and intensity response information and a target spatial intensity profile, and apply the spatial adjustment mask to spatially-defined laser control parameters. Additionally, the control circuitry may be configured to control the laser to perform an additive manufacturing build operation to construct a part. The additive manufacturing build operation may be performed in accordance with the target spatial intensity profile due to application of the spatial adjustment mask.

According to yet other non-limiting, example embodiments, an apparatus including laser control circuitry for implementation within a laser additive manufacturing system is provided. The laser control circuitry may be configured to control a laser to perform a laser scan of a building surface, and receive, from a sensor, spectral and intensity response information captured during the laser scan of the build surface. The spectral and intensity response information may be indicative of at least a temperature at the building surface during the laser scan. The laser control circuitry may be further configured to correlate the spectral and intensity response information with spatial positioning of the laser during the laser scan to generate spatially-correlated spectral and intensity response information, generate a spatial adjustment mask based on the spatially-correlated spectral and intensity response information and a target spatial intensity profile, apply the spatial adjustment mask to spatially-defined laser control parameters, and control the laser to perform an additive manufacturing build operation to construct a part. In this regard, the additive manufacturing build operation may be performed in accordance with the target spatial intensity profile due to application of the spatial adjustment mask.

BRIEF DESCRIPTION OF THE SEVERAL VIEWS OF THE DRAWINGS

Figure 1:
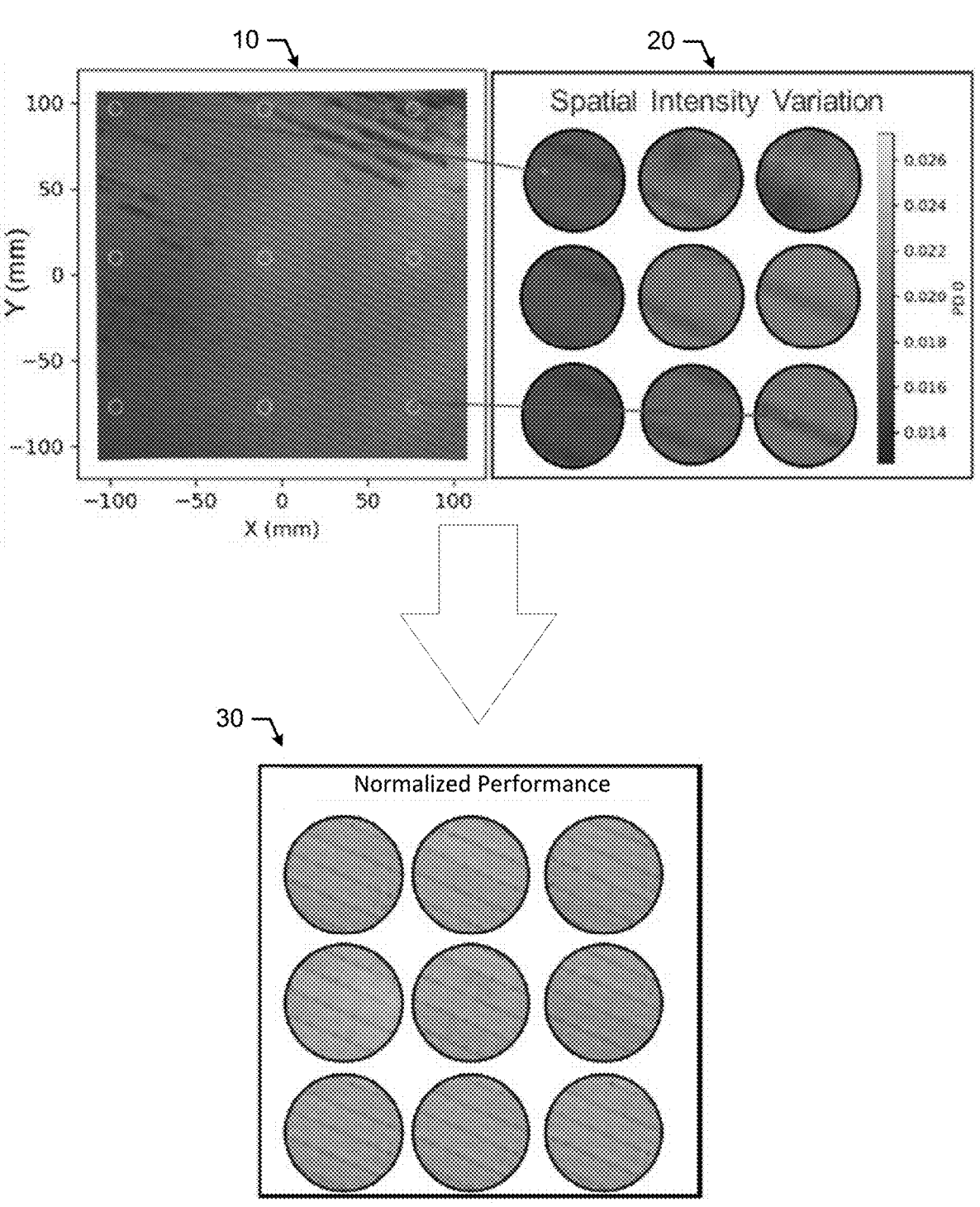
Figure 2:
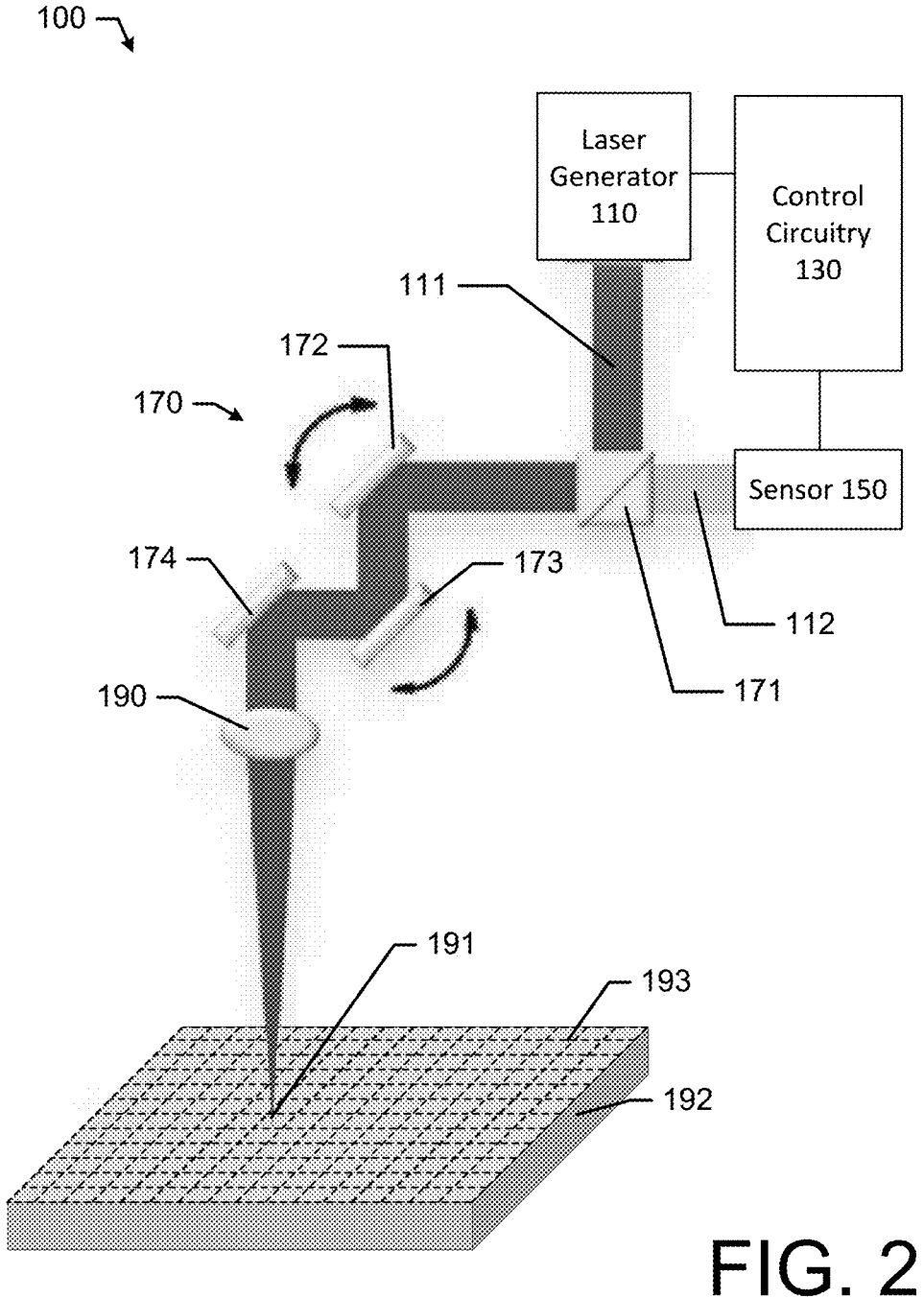
Figure 3:
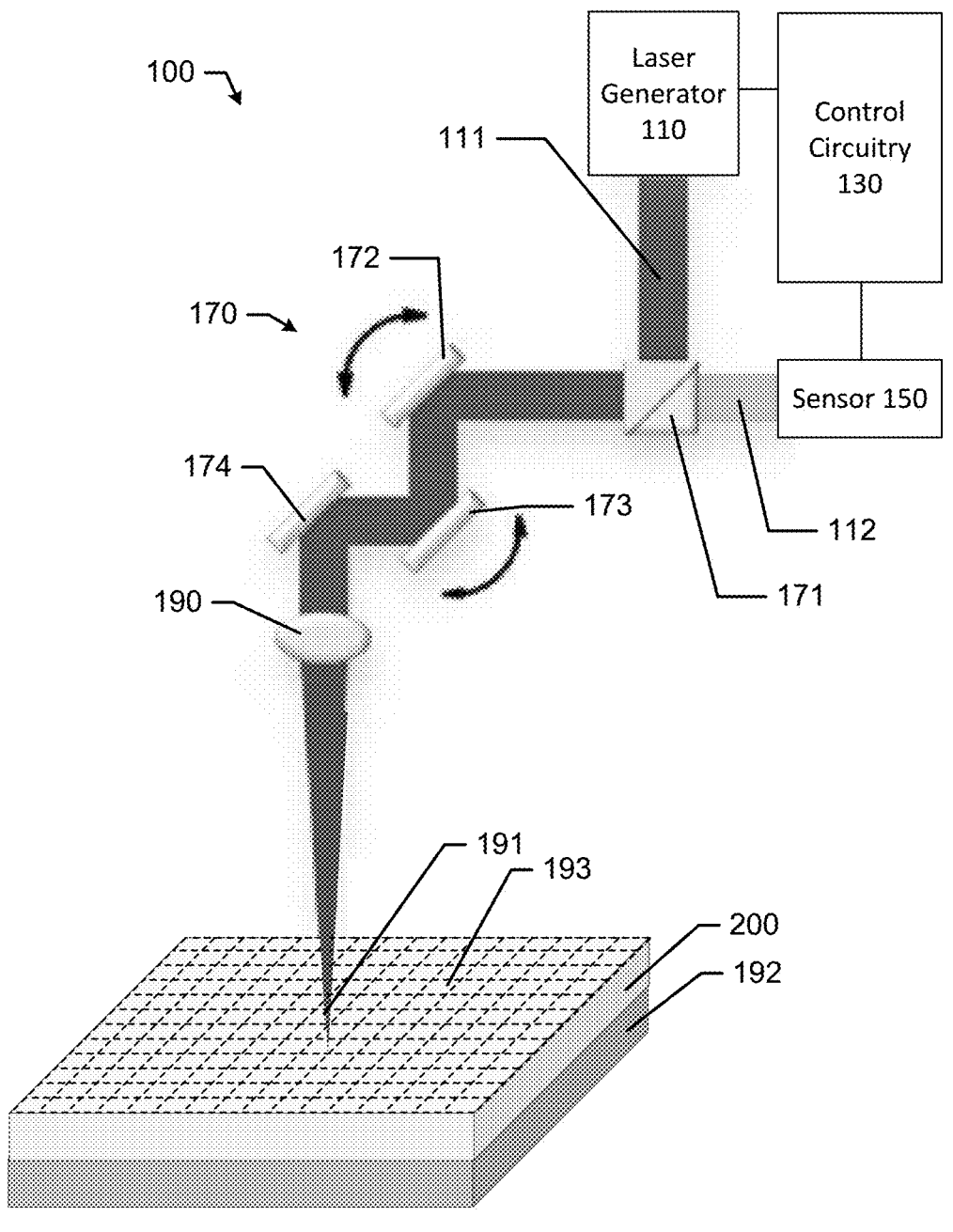
Figure 4:
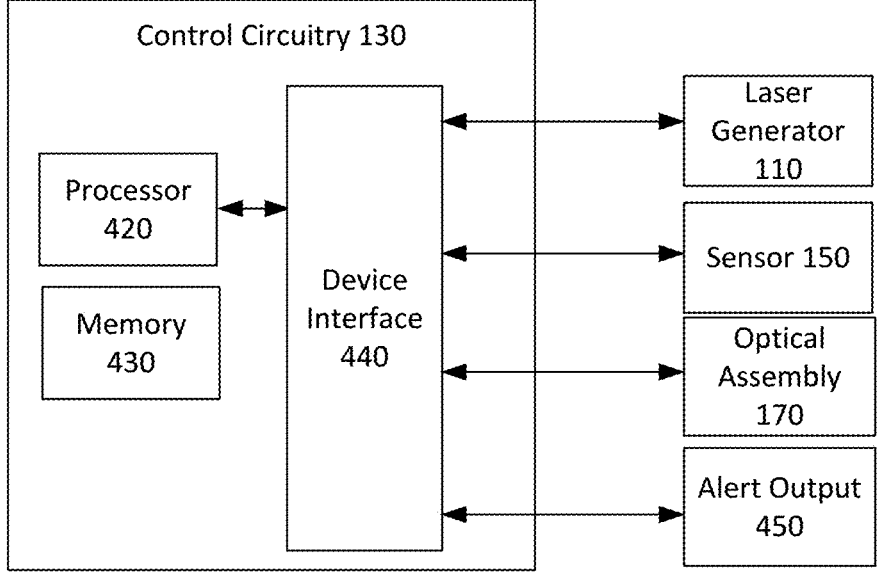
Figure 5:
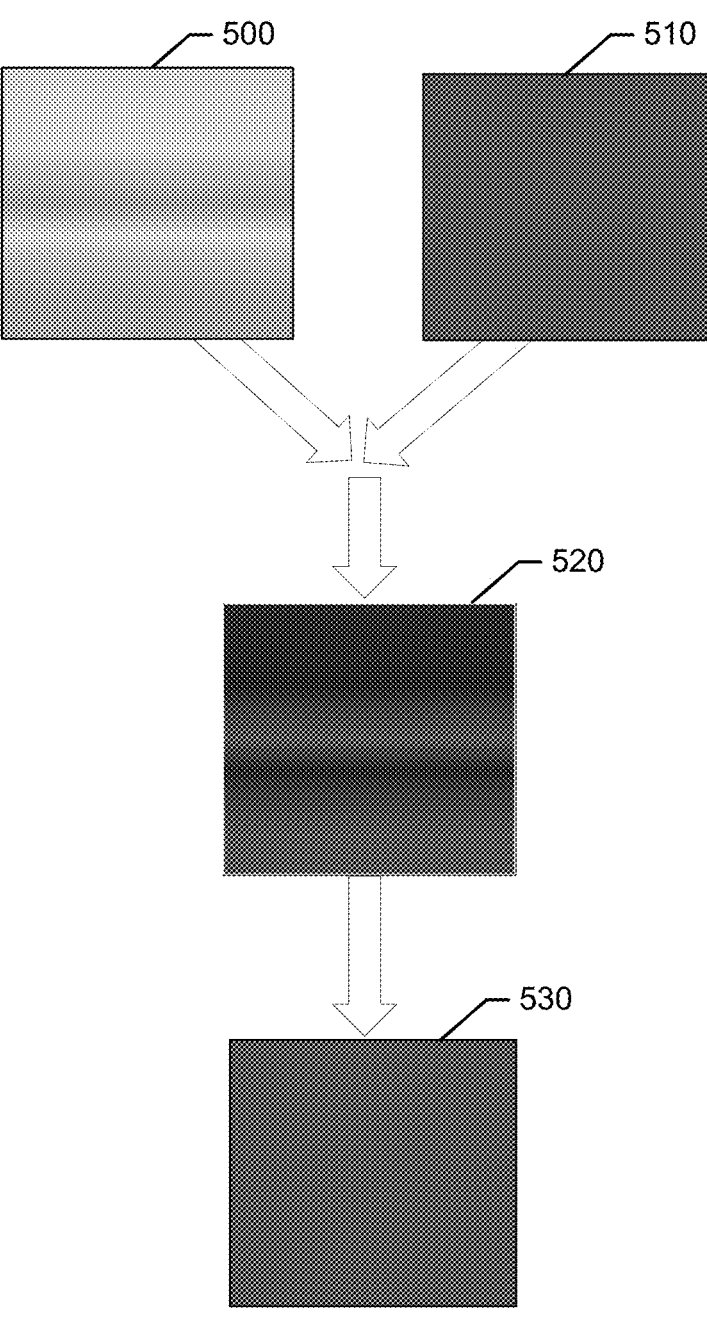
Figure 6:
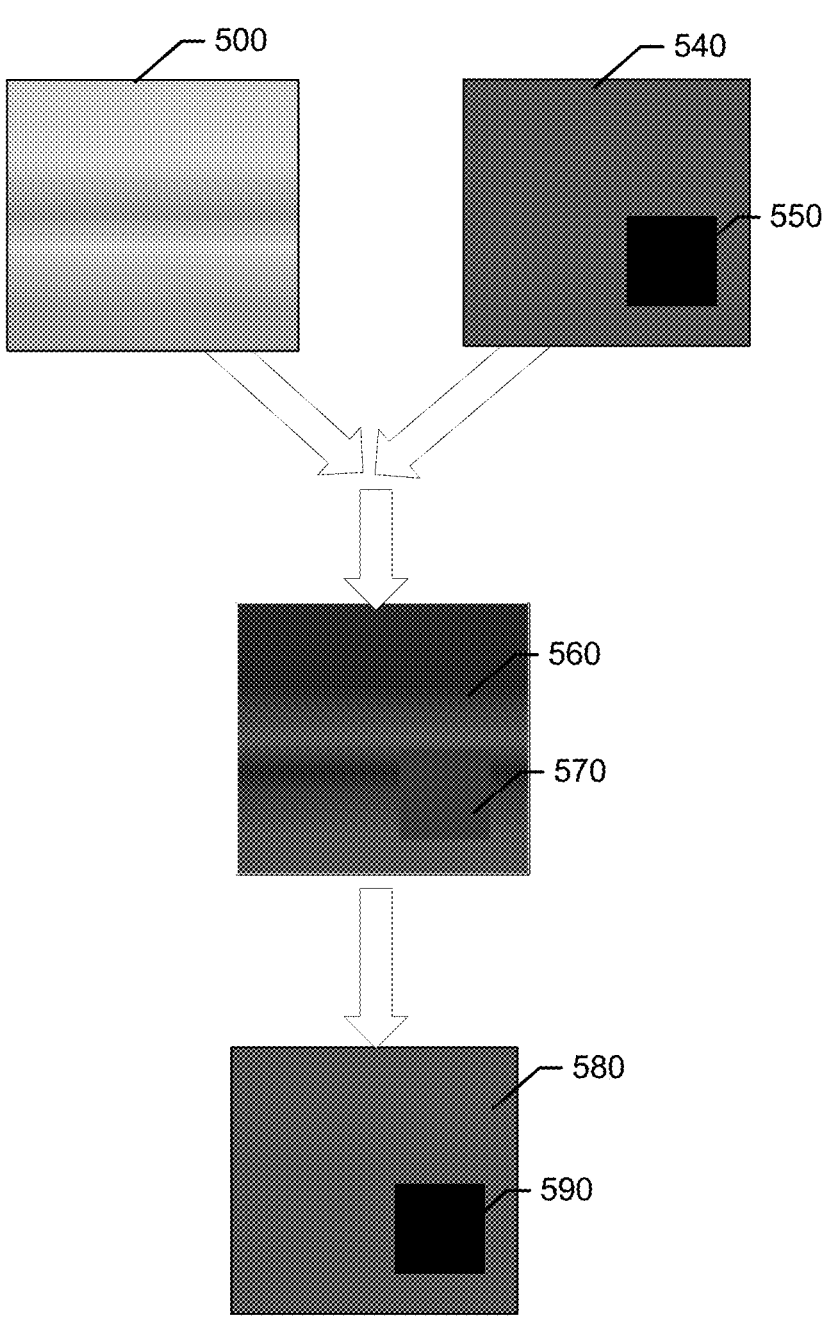

Having thus described some example embodiments in general terms, reference will now be made to the accompanying drawings, which are not necessarily drawn to scale, and wherein:

FIG. 1 illustrates a visual representation of a uniform intensity adjustment outcome according to some example embodiments;

FIG. 2 illustrates an example additive manufacturing system laser scanning a build plate according to some example embodiments;

FIG. 3 illustrates an example additive manufacturing system laser scanning a construction material layer according to some example embodiments;

FIG. 4 illustrates a block diagram of control circuitry for an additive manufacturing system according to some example embodiments;

FIG. 5 illustrates an example visual flow diagram for generating a spatial adjustment mask for a uniform target spatial intensity profile according to some example embodiments;

FIG. 6 illustrates an example visual flow diagram for generating a spatial adjustment mask for a non-uniform target spatial intensity profile according to some example embodiments; and FIG. 7 illustrates an example method for adjusting laser control parameters of a laser additive manufacturing system for construction of a part according to some example embodiments.

DETAILED DESCRIPTION

Some non-limiting, example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to various example embodiments, systems, apparatuses, and methods are described herein that enable an ability calibrate a laser of an additive manufacturing system to for example, generate uniform energy coupling at a building surface (e.g., surface of a build plate or surface of a part under construction), thereby controlling energy coupling based on characteristics at the true interaction point of the laser. In this regard, via the use of, for example, an on-laser-axis, multiband spectral sensor, an assessment of the thermal conditions at the surface can be ascertained, and corrections for spatial irregularities in the laser output can be implemented. According to some example embodiments, the thermal conditions at the surface can be ascertained, for example, independent of material properties of the surface.

To do so, according to some example embodiments, control circuitry may be configured to generate a spatial adjustment mask that, when applied to control parameters of the laser, results in thermal homogeneity and stability across the building surface. Such a spatial adjustment mask need not, however, only provide for such uniform performance. According to some example embodiments, a target special intensity profile that is used to develop of the spatial adjustment mask may be defined to adjust the laser output in any non-uniform and spatially tailored manner for use in appropriate applications.

Through use of the sensor, frequent and even mid-build assessment of additive manufacturing system performance can be performed, thereby offering the ability to adjust laser control parameters to achieve, for example, sustained high-performance operation during builds. In this regard, according to some example embodiments, a laser or other energy source-based additive manufacturing system (e.g., a laser powder bed fusion system) may include a multi-band spectral sensor that can be leveraged to detect spectral and intensity response information during, for example, a pre-build or mid-build scanning operation. Some spectral sensor, according to some example embodiments, may be configured to measure a particular band of the electromagnetic spectrum or the full electromagnetic spectrum. Such spectral and intensity response information may be spatially correlated to determine if performance of the laser is changing relative to location of the beam. Accordingly, it may be determined that the system, and in many cases the laser, operates differently as a function of the spatial positioning of the laser. As a result, the operation of the additive manufacturing system and the laser may be modified to, for example, compensate for degraded or non-uniform performance at determined locations to thereby maintain, for example, a predictable and reliable build quality for the system.

As mentioned above, the additive manufacturing system, according to some example embodiments, may include a spectral sensor that may be configured to detect a wide range of wavelengths of light (e.g., select wavelength ranges). In this regard, the spectral sensor may be configured to detect light within a plurality of wavelength bands. According to some example embodiments, the spectral sensor may be configured to detect, for example, three bands (channels) of visible light and one band (channel) of ultraviolet light. Via detection of the spectral and intensity response from the laser acting upon a building surface (e.g., a build plate, the surface of part under construction, or the like) during a scanning (e.g., non-build) operation, spectral and intensity response information can be captured within the wavelength detection bands of the sensor. By collecting spectral and intensity data across multiple wavelength bands (e.g., including visible and infrared bands), a high degree of certainty can be reached for determining a temperature at the building surface. The scanning operation may involve moving or directing the laser across an entire building surface while the sensor captures spectral and intensity response information. As such, the captured spectral and intensity response information can be spatially correlated to the building surface to thereby permit position-based processing and provide insights into operation as a function of the position of the laser. Such processing may detect and compensate for issues caused by components that may act upon the laser to deliver the laser to the building surface, such as optical components that act upon the laser between the laser generator output and the interaction point of the laser with the building surface (e.g., the melt zone). As such, the spectral and intensity response information may be processed to determine, for example, build surface temperature at locations across the build surface. Accordingly, a delta between the desired conditions at the building surface and the actual conditions at the building surface can be determined to develop a spatial adjustment mask that can be subsequently applied to spatially-defined laser control parameters to realize an output that is consistent with the desired conditions, such as desired thermal conditions.

Using such an approach for calibration is a significant improvement over conventional calibration procedures for additive manufacturing systems. In this regard, conventional calibration procedures can be time-consuming and labor intensive. As a result, such conventional calibration procedures are rarely performed, and, in some cases, only performed when necessary due to obvious poor performance of a system. Additionally, conventional calibration methods rely on only a small sample size (e.g., nine) of assessment points when performing a calibration, and those points are typical relatively large in size. This is in contrast to some example embodiments described herein, which can assess the laser performance across, for example, millions of small-sized positions to capture extremely granular, spatially-correlated information on the performance of the laser. Methods performed in accordance with some example embodiments may be performed in an automated manner facilitating more frequent assessments of laser performance and adjustment to the operating parameters to maintain desired conditions. In this regard, for example, such methods may be implemented before each build, during the course of a build, or the like.

The access to such frequent assessment of system operation may assist in combating many of the issues that diminish the performance of additive manufacturing systems. In this regard, for example, build operations may cause the generation of debris, dust, fumes, gases, and the like that tend to impair the operation of the system. For example, optical components, such as lenses and mirrors, may be soiled or even damaged during the build operation. However, according to some example embodiments, the operation of the laser, including the optics associated with the laser, may be assessed via the scanning and spectral response capture process and compensated for, regardless of the specific cause of an issue (e.g., a laser generator issue, an optical system issue, or the like). As a result, control circuitry that operates the system may analyze the spectral and intensity response information and determine operating adjustments that may be spatially correlated, to compensate, for example, for optically-induced variances in laser intensity and other causes of degraded system performance. Such adjustments to operating parameters may enable spatially stable thermal inputs from the laser across, for example, the build plate as the building surface. Additionally, reduced microstructure variations within a part, from part-to-part, and from system-to-system may be realized, leading to a rapid acceleration of the time needed to qualify parts (e.g., for use in aviation, as mentioned above).

Having described some concepts and features of some example embodiments, reference is now made to FIG. 1, which provides a visual representation of an adjustment, which in this case is a normalization, of performance according to some example embodiments. Image 10 show a build plate surface with intensity information overlaid to show where differences (e.g., hot spot and cold spot) exist on the build plate during a laser scan operation. It is noteworthy that the differences are spatially-dependent. Merely for understanding, nine locations on the build plate have be isolated and zoomed in image 20 to better reveal the spatial differences in the intensity response these select locations. Based on this information and the implementation of some example embodiments, a more uniform energy coupling across the build plate can be realized as shown in image 30. As can be seen, a more consistent intensity response has been achieved via the development and implementation of a spatial adjustment mask that has been applied to spatially-defined laser control parameters to control the laser differently based on position, resulting in a more uniform receipt of energy at the build plate.

Now referring to FIGS. 2 and 3, an additive manufacturing system 100 is illustrated in accordance with various example embodiments. The system 100 may be utilize techniques such as directed energy disposition or selective laser melting (SLM). SLM is a type of metal additive manufacturing approach that uses a laser or other energy source to melt or fuse a metal powder onto a substrate to build a metal part in a layered process. In this regard, according to some example embodiments, a 3D model of a part may be designed and stored as a design model. The 3D design model may then be decomposed into a number of two-dimensional (2D) layers. The 2D layers may have a thickness of, for example, 20 to 100 micrometers. The SLM system may construct the part by forming each of the 2D layers in a process where each layer is constructed on a next layer, one layer at a time.

The example system 100, which may be an SLM system, may include a laser generator 110, control circuitry 130, a sensor 150, and an optical assembly 170. FIG. 2. illustrates a build plate 192 with an overlayed grid 193 to provide a spatial reference for an interaction point 191 of the laser 111. Accordingly, in FIG. 1, the building surface may be the surface of the build plate 192. FIG. 3 illustrates the build plate 192 with a construction material layer 200 having been constructed on the build plate 192, again with the grid 193 overlayed now on the construction material layer 200 to provide a spatial reference for the interaction point 191 of the laser 111. As such, with respect to FIG. 3, the building surface may be the surface of the construction material layer 200.

The laser generator 110 may be configured to controllably output the laser 111 based on laser control parameters provided by the control circuitry 130. According to some example embodiments, the laser generator 110 may be a high or low-powered laser generator (e.g., 50 watt, 100 watt, 200 watt, 400 watt or more or less) with intensity controls. According to some example embodiments, the laser generator 110 may be a generator of another type of energy source device such as an electron beam generator, a microwave beam generator, or the like. The laser 111 may, with the assistance of the optical assembly 170, move across a building surface to cause thermal heating for the purpose of, for example, controlling the melting of a metal powder to build a part. In this regard, the optical assembly 170 may include controllable elements (e.g., mirrors) for directing the laser at desired locations on the build surface, and the control circuitry 130 may control the optical assembly 170 in a coordinated manner with the laser generator 110 via spatially-defined laser control parameters. During a manufacturing build operation, the control circuitry 130 may be configured to control the laser generator 110 based on a 3D design model of the part or 2D layers of the 3D part model to construct the part.

The optical assembly 170 may be configured to control the position of the interaction point 191 of the laser 111 with the build surface. Movement of the interaction point 191 may be performed in a variety of ways. The optical assembly 170, according to some example embodiments, uses an optical train that includes moveable mirrors and lenses to position and focus the laser 111. In this regard, as the laser 111 leaves the laser generator 110, the laser 111 interacts with a dichroic mirror 171. The dichroic mirror 171 may be configured to reflect light of one wavelength and pass light of another wavelength. As described further below, the dichroic mirror 171 may reflect the wavelength of the laser 111 and pass the wavelengths of interest for receipt by the sensor 150. Having reflected the laser 111, the dichroic mirror 171 directs the laser 111 into a galvo assembly.

The galvo assembly may include two or more mirror, with, for example, two of the mirrors being moveable galvo mirrors 172 and 173. The galvo mirrors 172 and 173 may be configured to pivot to change the directionality of the laser 111 as it passes through the galvo assembly. In this regard, the galvo mirrors 172 and 173 may be affixed to respective actuators (e.g., servos) that may be controlled by the control circuitry 130. As such, the control circuitry 130 may control the galvo mirrors 172 and 173 to move the laser 111 to a desired location on the building surface for an action that is being performed. According to some example embodiments, the optical assembly 170 may include additional fixed mirrors, such as fixed mirror 174, which may operate to position the laser 111 for interaction with a subsequent component.

In this regard, the mirror 174 may be configured to reflect the laser 111 to a lens 190. The lens 190 may be, according to some example embodiments, an optical laser correction focus apparatus, such as, for example, an f-theta lens. In this regard, the lens 190 may be configured use with scanning and material processing. The lens 190 may provide for linear displacement and have a constant scan rate. The lens 190 may also be a focusing lens that increases the intensity at a focal point. In this regard, the lens 190 may receive the laser 111 from the mirror 174 and apply a linear displacement to position and focus the laser 111 at the interaction point with the building surface.

Accordingly, the laser 111 then passes through the lens 190 and is incident upon the building surface (e.g., surface of the build plate 192, surface of the construction material layer 200, or the like). Upon the laser 111 interacting with the building surface at the interaction point 191, light from the interaction will be reflected, which will include light of various wavelengths having intensities that are related to the temperature and materials that are being acted upon. The reflected light may travel back through the lens 190 and through the optical assembly 170 to the dichroic mirror 171. Since the dichroic mirror 171 may pass light at certain wavelengths, the reflected light 112 may pass though the dichroic mirror 171 and to the sensor 150. In this regard, because the reflected light passes through the same path as the laser 111, the sensor 150 may be considered "on-axis" with the laser 111. In other words, no parallax-based or positional offsets need to be considered with such an on-axis sensor due to being positioned in-line with the path of the laser 111. While the example embodiments shown in FIGS. 2 and 3 illustrate a sensor 150 that is on-axis with the laser 111, one of skill in the art would appreciate that an off-axis sensor may alternatively be employed in according to some example embodiments. Such an off-axis sensor may require consideration of the change in optical path for the reflected light when processing the spectral and intensity information received by the off-axis sensor. However, such consider-ations may be included in a transfer function that may be utilized to generate the spatial adjustment mask. As such, an off-axis sensor may be adjusted for in the data processing performed by the control circuitry 130 based on the spatial positioning of the off-axis sensor within the system 100. In this regard, a position and perspective angle of the off-axis sensor may be stored so that the position and perspective angle may be considered during data processing.

The sensor 150 may be configured to detect light within one or more wavelength ranges and generate spectral and intensity response information based on the detected light for provision to the control circuitry 130. In this regard, the sensor 150 may include or be embodied as a photodiode, a camera, or another type of light detecting sensor. According to some example embodiments, the sensor 150 may include a photomultiplier tube or a silicon photomultiplier (SiPM) detector. A SiPM, according to some example embodiments, may be selected that has ultra-high sensitivity, high dynamic range, and high bandwidth, and such attributes of the SiPM may be valuable in low light and low signal-to-noise con-ditions within the visible and near infrared wavelengths.

According to some example embodiments, the sensor 150 may include internal optics to separate and filter the reflected light into a plurality of wavelength responses. In this regard, for example, particular wavelengths may be selected for monitoring based on the build applications (e.g., typical materials, types of builds, etc.) that provide useful informa-tion for determining temperatures that are being imple-mented in such builds, as well as chemical changes that may be occurring. According to some example embodiments, the internal optics of the sensor 150 may separate four wave-lengths of reflected light for processing, understanding that any number of wavelengths can be considered according to some example embodiments. While an increased number of wavelengths can lead to improved accuracy for temperature measurements, in some applications the added complexity may have diminishing returns based, for example, on the ability to control the output of the laser generator 110. According to some example embodiments, where four wavelengths are considered, the wavelengths may include, for example, three visible spectrum wavelengths and one infrared spectrum wavelength. More specifically, according to some example embodiments, the infrared spectrum wave-length may be a near infrared spectrum wavelength or a far infrared spectrum wavelength. However, any collection of wavelengths may be used or selected, such as, for example, gamma ray, x-ray, ultraviolet, microwave, radio, or the like. The information for each of the wavelengths may inherently include spectral information based on the separation and filtering, but the information may also include intensity information for that spectral wavelength for use in process-ing to determine, for example, thermal conditions. Regard-less of the number of wavelengths that may be used, the collection of information, possibly separated by wavelength, may be provided to the control circuitry 130 as spectral and intensity response information for processing.

Accordingly, the control circuitry 130 may be configured to receive spectral and intensity response information from the sensor 150, and control the operation of the laser generator 110 and the optical assembly 170. The control circuitry 130 may be configured to control the operation of the laser generator 110 and the optical assembly 170 in accordance with a build operation for building a part based on a supplied model of the part. However, according to some example embodiments, the control circuitry 130 may be configured to assess the performance of the system 100 and more specifically the laser 111 incident on the building surface, and adjust the operation of the laser 111 based on the assessment, for example, in a pre-build operation or in a mid-build operation. As such, the control circuitry 130 may control the direction of the laser 111, as well as other characteristics, such as the intensity of the laser 111.

Now referring to FIG. 4 and the control circuitry 130 while also recalling the context of the control circuitry 130 in FIGS. 2 and 3. According to some example embodiments, control circuitry 130 may monitor, analyze, and make adjustments to an additive manufacturing system 100 involving the laser 111. In this regard, the control circuitry 130 may be centralized in a single device or distributed across a number of devices. For example, some functionalities that are described herein that more closely associated with the sensor 150 may be housed and implemented with the sensor 150 by a portion of the control circuitry 130.

Control circuitry 130 may include a processor 420, a memory 430, and a device interface 440. Additionally, the control circuitry 130 may include additional components not shown in FIG. 4 and the control circuitry 130 may be operably coupled to other components of the system 100 that are not shown. Further, according to some example embodiments, control circuitry 130 may be in operative communication with or embody, the memory 430, the processor 420, and the device interface 440. Through configuration and operation of the memory 430, the processor 420, and the device interface 440, the control circuitry 130 may be configurable to perform various operations as described herein, including the operations and functionalities described with respect the development and application of spatially-defined laser control parameters. In this regard, according to various example embodiments, the control circuitry 130 may be configured to perform computational processing, memory management, additive manufacturing control and monitoring, and the like. In some embodiments, the control circuitry 130 may be embodied as a chip or chip set. In other words, the control circuitry 130 may include one or more physical packages (e.g., chips) including materials, components, or wires on a structural assembly (e.g., a baseboard). The control circuitry 130 may be configured to receive inputs (e.g., via peripheral components, such as the sensor 150), perform actions based on the inputs, and generate outputs (e.g., for provision to peripheral components, such as the laser generator 110, the optical assembly 170, and the alert output 450). In an example embodiment, the control circuitry 130 may include one or more instances of the processor 420, associated circuitry, and the memory 430. As such, the control circuitry 130 may be embodied as a circuit chip (e.g., an integrated circuit chip, such as a field programmable gate array (FPGA)) configured (e.g., with hardware, software or a combination of hardware and software) to perform operations described herein. As such, according to some example embodiments, the control circuitry 130 may execute software instructions that define the operations described herein.

In an example embodiment, the memory 430 may include one or more non-transitory memory devices such as, for example, volatile or non-volatile memory that may be either fixed or removable. The memory 430 may be configured to store information, data, applications, instructions or the like for enabling, for example, the functionalities described with respect to the control circuitry 130. The memory 430 may operate to buffer instructions and data during operation of the control circuitry 130 to support higher-level functionalities, and may also be configured to store instructions for execution by the control circuitry 130. The memory 430 may also store various information including spectral and intensity response information. According to some example embodiments, various data stored in the memory 430 may be generated (e.g., thermal data) based on other received data (e.g., spectral and intensity response information).

As mentioned above, the control circuitry 130 may be embodied in a number of different ways. For example, the control circuitry 130 may be embodied as various processing means such as one or more processors 420 that may be in the form of a microprocessor, graphics processing unit, or other processing element, a coprocessor, a controller, or various other computing or processing devices including integrated circuits such as, for example, an ASIC (application specific integrated circuit), an FPGA, or the like. In an example embodiment, the control circuitry 130 may be configured to execute instructions stored in the memory 430 or otherwise accessible to the control circuitry 130. As such, whether configured by hardware or by a combination of hardware and software, the control circuitry 130 may represent an entity (e.g., physically embodied in circuitry—in the form of control circuitry 130) capable of performing operations according to example embodiments while configured accordingly. Thus, for example, when the control circuitry 130 is embodied as an ASIC, FPGA, or the like, the control circuitry 130 may be specifically configured hardware for conducting the operations described herein. Alternatively, as another example, when the control circuitry 130 is embodied as an executor of software instructions, the instructions may specifically configure the control circuitry 130 to perform the operations described herein.

The device interface 440 may be input/output interface that operates between the control circuitry 130 and peripheral devices that are controlled by and/or provide data to the control circuitry 130. According to some example embodiments, the device interface 440 may be integrated into the control circuitry 130 or the device interface 440 may be housed in a separate component configured to translate or otherwise interface with the peripheral devices in a manner that the control circuitry 130 may not be able to directly. However, according to some example embodiments, the control circuitry 130 may be configured to directly interface with peripheral devices via, for example, the device interface 440.

In this regard, via the device interface 440, the control circuitry 130 may be configured to interface with the laser generator 110 (or other energy source generator), the sensors 150, the optical assembly 170, and the alert output 450. In this regard, control circuitry 130 may be configured to interface with the laser generator 110 to control operation of the laser generator 110 in the process of performing additive manufacturing as described herein or an assessment scan of a building surface. As mentioned herein, the control circuitry 130 may be configured to control the direction and intensity of the laser 111 generated by the laser generator 110 (or other energy beam generated by an energy source generator). Further, the laser 111 generated by the laser generator 110 may be scanning laser, and therefore the control circuitry 130 may be configured to control the scanning and build operations of the laser 111 for assessing performance or fusing additive media to perform a manufacturing operation.

The control circuitry 130 may also be configured to control the sensor 150. In this regard, the control circuitry 130 may be configured, according to some example embodiments, to control a sample rate of the sensor 150. Further, according to some example embodiments, the control circuitry 130 may be configured to control the wavelength bands that the sensor 150 captures according to some example embodiments. In this regard, the control circuitry 130 may be configured to control various operational parameters of the sensor 150, in addition to receiving spectral and intensity response information from the sensor 150.

According to some example embodiments, the control circuitry 130 may be configured, via software instructions or hardware structure, to operate as integrated or dedicated circuitry for the operation of some example embodiments. However, in some example embodiments, the control circuitry 130 may be employed to perform other operations and, as such, the functionality performed in according to some example embodiments described herein may be implemented as a module of the control circuitry 130, such as calibration module or a performance module. Such a module may be circuitry that is part of or a configuration of the processor 420, possibly in combination with the memory 430. As such, the module may be configured to cause the control circuitry 130 to perform various functionalities. The module, and thus the control circuitry 130, may be configured to control the laser generator 110, the sensor 150, the optical assembly 170, and the alert output 450 as provided herein and described below with respect to the configuration of the control circuitry 130.

In this regard, according to some example embodiments, the control circuitry 130 may be configured to adjusting laser control parameters of a laser additive manufacturing system 100 for construction of a part. To do so, the control circuitry 130 may be configured to control the laser 111 to perform a laser scan of a building surface (e.g., the surface of the build plate 192 or the surface of the construction material layer 200). A laser scan, according to some example embodiments, may include a process of moving or rastering the interaction point 191 of the laser 111 across, for example, an entire area of the building surface at a constant or known intensity. According to some example embodiments, rather than moving across an entire area of the building surface, certain specific areas may be defined where the laser scan may be performed while other areas are avoided. In this regard, for example, if the part to be manufacture in a subsequent build will only be positioned on a portion of the build plate 192, then a laser scan of only the portion of the build plate 192 may be performed to, for example, avoid unnecessary scanning and processing of spatially-defined laser control parameters that may not be utilized during the build.

To perform the laser scan, the control circuitry 130 may control both the laser generator 110 and the optical assembly 170 in a coordinated fashion. The control circuitry 130 may track the position of the laser 111 (e.g., as laser position information) for correlating the position of the laser 111 during the laser scan with the spectral and intensity response information received from the sensor 150. According to some example embodiments, such a laser scan may be performed at, for example, a low intensity (e.g., below a melting temperature of the building surface). As such, according to some example embodiments, the laser scan may be performed outside of the manufacturing operations for building a part. In this regard, the laser scan may be performed as a preliminary operation performed before a build is begun. However, according to some example embodiments, a build operation may be temporarily discontinued, and the laser scan may be performed during this time, for example, over the construction material layer 200.

During the laser scan, the sensor 150 may capture the spectral and intensity response information provided in the reflected light as described above. The control circuitry 130 may be further configured to receive, from the sensor 150, the spectral and intensity response information captured during the laser scan of the build surface. The spectral and intensity response information may be provided as raw sensor data or the sensor 150 may perform some preprocessing to generate the spectral and intensity response information. The spectral and intensity response information may include information that is indicative of at least a temperature at the building surface during the laser scan. According to some example embodiments, the spectral and intensity response information may include information indicating the wavelength of light received and the intensity of the light receive at various wavelengths. Such spectral and intensity response information may be processed to determine temperature. Additionally, the spectral and intensity response information may be processed to determine chemical information, for example, the occurrence of chemical reactions that can be identified based on the spectral response (i.e., wavelengths of light) included in the spectral and intensity response information.

The control circuitry 130 may be further configured to correlate the spectral and intensity response information with spatial positioning of the laser during the laser scan to generate spatially-correlated spectral and intensity response information. In this regard, according to some example embodiments, the position of the laser 111 need not be detected because the position of the laser 111 may be known to the control circuitry 130. However, in some example embodiments, the position of the laser 111 may be detected and provided to the control circuitry 130, for example, by a second sensor, to permit the ability to determine undesired laser position offsets that may occur as a result of, for example, misaligned or flawed optics. Such a second sensor may be off-axis from the laser 111 to permit determinations of relative positioning. In any event, the control circuitry 130 may possess the position information of the laser 111 for correlation with the spectral and intensity response information. Such data correlation process may occur in real-time or a time-stamp matching scheme may be used to correlate the spectral and intensity response information with a spatial position based on matching time stamps for each. As a result of the correlation, a data set of spatially-correlated spectral and intensity response information may be generated that indicates, for example, the locations of hot spots or cold spots in the building surface, for consideration during further processing.

As described above, according to some example embodiments, a uniform energy coupling across the building surface may be desired for operation of an additive manufacturing system. However, uniform energy coupling (i.e., uniform heating) may be just an example of a desired performance for an additive manufacturing system. As such, according to some example embodiments, the control circuitry 130 may be configured to receive a target spatial intensity profile that defines a desired operation of the additive manufacturing system and laser operation across the building surface. According to some example embodiments, a user may tailor a target spatial intensity profile and send the target spatial intensity profile to the control circuitry 130 via a communications interface for use in according to some example embodiments. As such, the target spatial intensity profile may define, for example, desired temperatures for desired locations across the building surface. Alternatively, according to some example embodiments, the target spatial intensity profile may simply be a temperature or energy level that may be targeted across the entire area of the building surface. In any event, the target spatial intensity profile may defined the desired spatial laser performance across the area of the building surface.

The control circuitry 130 may also be configured to generate a spatial adjustment mask based on the spatially-correlated spectral and intensity response information and a target spatial intensity profile. In this regard, the control circuitry 130 may process the target spatial intensity profile, as the desired outcome, with the spatially-correlated spectral and intensity response information, as the current conditions, to determine the operating parameter modifications needed to achieve the target spatial intensity profile. In other words, the control circuitry 130 may be configured to leverage a transfer function that operates based on the target spatial intensity profile and the spatially-correlated spectral and intensity response information to determine a spatial adjustment mask. The spatial adjustment mask, when combined with the spatially-correlated spectral and intensity response information, may result in the target spatial intensity profile. Such a transfer function may include operations such as, for example, multiplication, convolution, superposition, or the like to determine the spatial adjustment mask for the building surface. According to some example embodiments, the spatial adjustment mask may be digital data set that defines the adjustments for operating the laser 111 as desired.

According to some example embodiments, the control circuitry 130 may be further configured to apply the spatial adjustment mask to spatially-defined laser control parameters. In this regard, the control circuitry 130 may employ the spatial adjustment mask by applying the spatial adjustment mask to spatially-defined laser control parameters during control of the laser generator 110 to prepare for implementing the adjustments included in the spatial adjustment mask. According to some example embodiments, application of the spatial adjustment mask may be performed in a manner that a build control processes are unaware that the spatial adjustment mask has been applied by for example, implementing the spatial adjustment mask below the application layer of computer operation, such as at the operating system layer or a firmware layer. As such, the operation of the laser 111 may be modified without the need to adjust build-related processes and procedures.

Finally, the control circuitry 130 may also be configured to control the laser 111 to perform an additive manufacturing build operation to construct a part with the spatial adjustment mask applied. In other words, the additive manufacturing build operation may be performed in accordance with the target spatial intensity profile due to application of the spatial adjustment mask on the operations requested by the control circuitry 130 for implementing a build.

With respect to developing the spatial adjustment mask, reference will now be made to FIGS. 5 and 6, which provide image-based flow diagrams of the spatial adjustment mask development process. In this regard, referring to FIG. 5, a visual representation of spatially-correlated spectral and intensity response information is shown at 500. In this regard, the 2D area of the building surface is shown with the detected variations in, for example, thermal response being indicated by the darker and lighter portions. Additionally, a visual representation of an example target spatial intensity profile is shown at 510. As can be seen, the example target spatial intensity profile is uniform across its area and therefore the target spatial intensity profile at 510 is indicative of a desire to have a uniform intensity across the building surface. As described above, the spatially-correlated spectral and intensity response information and the target spatial intensity profile may be processed to determine a spatial adjustment mask with a visual representation of the spatial adjustment mask shown at 520. When the spatial adjustment mask at 520 is applied to the spatially-defined laser control parameters, the result may be actual intensity profile shown at 530, which, under ideal conditions should match the target spatial intensity profile at 510.

Having described a uniform target spatial intensity profile, reference to FIG. 6 is made to describe a non-uniform target spatial intensity profile. As described with respect to FIG. 5, a visual representation of spatially-correlated spectral and intensity response information is shown at 500. Additionally, a visual representation of an example target spatial intensity profile is shown at 540. In this instance, the target spatial intensity profile includes a region 550 that is to be adjusted differently than the remainder of the target spatial intensity profile, thereby embodying a non-uniform target spatial intensity profile. As described above, the spatially-correlated spectral and intensity response information and the target spatial intensity profile may be processed to determine a spatial adjustment mask with a visual representation of the spatial adjustment mask shown at 560 with non-uniform region 570. When the spatial adjustment mask at 560 is applied to the spatially-defined laser control parameters, the result may be actual intensity profile shown at 580 with the non-uniform region 590, which, under ideal conditions should match the target spatial intensity profile at 540.

According to some example embodiments, the control circuitry 130 may further configured to implement additional functionality in according to some example embodiments. In this regard, the control circuitry 130 may be configured to perform a first laser scan of the build plate 192 and then a second laser scan of a construction material layer 200 and the respective spectral and intensity response information may be combined to further improve the operation of the laser 111 and the additive manufacturing system in accordance with a target spatial intensity profile. According to some example embodiments, a scan of the construction material layer 200 may, in some instances, generate conditions (e.g., gases, airborne debris, etc.) that may not be present during a laser scan of the build plate 192. As such, including spectral and intensity response information from the construction material layer 200 laser scan may provide further information for operating the laser 111 at high performance during a build.

In this regard, the control circuitry 130 may be configured to control the laser to form a layer of construction material on the build plate, and control the laser to perform a second laser scan of the layer of construction material. The sensor 150 may be leveraged to detect, during the second laser scan, second spectral and intensity response information of the layer of construction material to be received by the control circuitry 130. The second spectral and intensity response information may be indicative of at least a temperature at a surface of the layer of construction material during the second laser scan. Additionally, the control circuitry 130 may be configured to correlate the second spectral and intensity response information with spatial positioning of the laser 111 during the second laser scan to generate spatially-correlated second spectral and intensity response information. Such correlation may be performed in the same or similar manner as described above with respect to the spectral and intensity response information of the first laser scan.

Accordingly, the control circuitry 130 may be configured to generate the spatial adjustment mask based on the spatially-correlated spectral and intensity response information associated with the first laser scan, the spatially-correlated second spectral and intensity response information, and the target spatial intensity profile. As such, the spatially-correlated spectral and intensity response information from both the first scan of the build plate 192 and the second scan of the construction material layer 200 may be combined with the target spatial intensity profile to develop a more robust spatial adjustment mask.

Additionally, according to some example embodiments, the degree of modifications incorporated in the spatial adjustment mask may be assessed to determine if maintenance of the additive manufacturing system is appropriate. In this regard, based on the spatial adjustment mask, a health of the additive manufacturing system may be ascertained. As such, a quantitative maintenance threshold may be defined that can be applied to the spatial adjustment mask, and if the spatial adjustment mask exceeds the maintenance threshold, the control circuitry 130 may be configured to trigger or transmit an alert indicating that the additive manufacturing system needs maintenance. To determine if the spatial adjustment mask exceeds the maintenance threshold, the spatial adjustment mask may be, for example, spatially averaged to determine an average adjustment value (e.g., an integer value) which can be readily compared to the maintenance threshold value (e.g., also an integer value) to determine if the threshold is exceeded. According to some example embodiments, a peak or largest control adjustment may compared to the maintenance threshold to determine if the maintenance threshold has been exceed and an alert is appropriate.

It is noteworthy that, in some implementations, the optical assembly 170 may be exposed, at least to some degree, the build space. As such, dust, gases, and debris from the building process can interact with the optics causing degraded operation of the mirrors and lenses. Moreover, optical components often include impurities and flaws that generally cannot be physically corrected. Such issues, predictably, are more common with lower cost optics. In conventional solutions, the degraded performance of lenses and mirrors, due to environmental exposure to the build process, may be remedied by manual cleaning or replacement of such components. Additionally, as mentioned above, manufacturing flaws and impurities in mirrors and lenses often cannot be corrected. However, according to some example embodiments, since the sensor is capturing the spectral and intensity information after the laser 111 has passed through the optical assembly 170, the modifications to the spatially-defined laser control parameters can account for these issues introduced by the degraded optical components. In other words, because the performance of the laser 111 is detected and monitored at the building surface, issues affecting the performance of the laser 111 that occur in the optical train can be compensated for, regardless of the source of the issues, by modifying the spatially-defined laser control parameters appropriately in according to some example embodiments.

Now referring to FIG. 7, an example method for adjusting laser control parameters of a laser additive manufacturing system for construction of a part is provided. In this regard, according to some example embodiments, the example method may include, at 700, controlling a laser of the laser additive manufacturing system to perform a laser scan of a building surface, and, at 710, detecting, by a sensor, spectral and intensity response information from the laser scan of the build surface. The spectral and intensity response information may be indicative of at least a temperature at the building surface during the laser scan. At 720, the example method may include correlating the spectral and intensity response information with spatial positioning of the laser during the laser scan to generate spatially-correlated spectral and intensity response information, and, at 730, generating a spatial adjustment mask based on the spatially-correlated spectral and intensity response information and a target spatial intensity profile. The example method may also include, at 740, applying, by control circuitry, the spatial adjustment mask to spatially-defined laser control parameters, and, at 750, controlling the laser to perform an additive manufacturing build operation to construct the part. In this regard, the additive manufacturing build operation may be performed in accordance with the target spatial intensity profile due to application of the spatial adjustment mask.

According to some example embodiments, the build surface may be a surface of a build plate, or a surface of a layer of construction material. According to some example embodiments where the build surface is a surface of a build plate, the laser scan is a first laser scan, the spectral and intensity response information is first spectral and intensity response information, and the spatially-correlated spectral and intensity response information is spatially-correlated first spectral and intensity response information, the example method may include further operations. In this regard, the example method may include controlling the laser to form a layer of construction material on the build plate, controlling the laser to perform a second laser scan of the layer of construction material, and detecting, by the sensor during the second laser scan, second spectral and intensity response information of the layer of construction material. Again, the second spectral and intensity response information may be indicative of at least a temperature at a surface of the layer of construction material during the second laser scan. Moreover, the example method may further include correlating the second spectral and intensity response information with spatial positioning of the laser during the second laser scan to generate spatially-correlated second spectral and intensity response information. Additionally, generating the spatial adjustment mask may be based on the spatially-correlated first spectral and intensity response information, the spatially-correlated second spectral and intensity response information, and the target spatial intensity profile.

According to some example embodiments, the target spatial intensity profile may include uniform energy coupling across a build area during the additive manufacturing build operation. Alternatively, according to some example embodiments, the target spatial intensity profile may nonuniform, spatially-tailored energy coupling across a build area during the additive manufacturing build operation.

According to some example embodiments, the sensor may be configured to capture the spectral and intensity response information within a plurality of electromagnetic spectrum wavelength bands. In this regard, one of the electromagnetic spectrum wavelength bands may include visible wavelengths and one of the electromagnetic spectrum wavelength bands may include infrared wavelengths. According to some example embodiments, the laser scan of the building surface may maintains an applied temperature below a melt temperature for the building surface. The example method, according to some example embodiments, may further include comparing the spatial adjustment mask to a maintenance threshold and triggering an alert in response to the spatial adjustment mask exceeding the maintenance threshold. According to some example embodiments, the sensor may detect on a common axis with output of the laser. Additionally, according to some example embodiments, the sensor may include a silicon photomultiplier (SiPM) detector, and the laser may be directed through an f-theta lens.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such examples are described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

What is claimed is:

1. A method for adjusting laser control parameters of a laser additive manufacturing system for construction of a part, the method comprising:

controlling a laser of the laser additive manufacturing system to perform a laser scan of a building surface;

detecting, by a sensor, spectral and intensity response information from the laser scan of the build surface, wherein the spectral and intensity response information is indicative of at least a temperature at the building surface during the laser scan;

correlating the spectral and intensity response information with spatial positioning of the laser during the laser scan to generate spatially-correlated spectral and intensity response information;

generating a spatial adjustment mask based on the spatially-correlated spectral and intensity response information and a target spatial intensity profile;

applying, by control circuitry, the spatial adjustment mask to spatially-defined laser control parameters; and controlling the laser to perform an additive manufacturing build operation to construct the part, the additive manufacturing build operation being performed in accordance with the target spatial intensity profile due to application of the spatial adjustment mask.

2. The method of claim 1, wherein the build surface is a surface of a build plate.

3. The method of claim 1, wherein the build surface comprises a surface of a layer of construction material.

4. The method of claim 1, wherein the build surface is a surface of a build plate;

wherein the laser scan is a first laser scan, the spectral and intensity response information is first spectral and intensity response information, and the spatially-correlated spectral and intensity response information is spatially-correlated first spectral and intensity response information;

wherein the method further comprises:

controlling the laser to form a layer of construction material on the build plate;

controlling the laser to perform a second laser scan of the layer of construction material;

detecting, by the sensor during the second laser scan, second spectral and intensity response information of the layer of construction material, wherein the second spectral and intensity response information is indicative of at least a temperature at a surface of the layer of construction material during the second laser scan; and correlating the second spectral and intensity response information with spatial positioning of the laser during the second laser scan to generate spatially-correlated second spectral and intensity response information;

wherein generating the spatial adjustment mask is based on the spatially-correlated first spectral and intensity response information, the spatially-correlated second spectral and intensity response information, and the target spatial intensity profile.

5. The method of claim 1, wherein the target spatial intensity profile comprises uniform energy coupling across a build area during the additive manufacturing build operation.

6. The method of claim 1, wherein the target spatial intensity profile comprises non-uniform, spatially tailored energy coupling across a build area during the additive manufacturing build operation.

7. The method of claim 1, wherein the sensor is configured to capture the spectral and intensity response information within a plurality of electromagnetic spectrum wavelength bands, wherein one of the electromagnetic spectrum wavelength bands includes visible wavelengths and one of the electromagnetic spectrum wavelength bands includes infrared wavelengths.

8. The method of claim 1, wherein the laser scan of the building surface maintains an applied temperature below a melt temperature for the building surface.

9. The method of claim 1 further comprising comparing the spatial adjustment mask to a maintenance threshold and triggering an alert in response to the spatial adjustment mask exceeding the maintenance threshold.

10. The method of claim 1, wherein the detecting by the sensor is performed on a common axis with output of the laser.

11. The method of claim 1, wherein the sensor comprises a silicon photomultiplier (SiPM) detector.

12. The method of claim 1, wherein the laser is directed through an f-theta lens.

13. A laser additive manufacturing system comprising:
a laser generator configured to generate a laser;
a laser movement assembly configured to direct a position of the laser;
a sensor configured to detect spectral and intensity response information associated with operation of the laser; and
control circuitry configured to:
control the laser to perform a laser scan of a building surface;
receive, from the sensor, the spectral and intensity response information captured during the laser scan of the build surface, wherein the spectral and intensity response information is indicative of at least a temperature at the building surface during the laser scan;
correlate the spectral and intensity response information with spatial positioning of the laser during the laser scan to generate spatially-correlated spectral and intensity response information;
generate a spatial adjustment mask based on the spatially-correlated spectral and intensity response information and a target spatial intensity profile;
apply the spatial adjustment mask to spatially-defined laser control parameters; and
control the laser to perform an additive manufacturing build operation to construct a part, the additive manufacturing build operation being performed in accordance with the target spatial intensity profile due to application of the spatial adjustment mask.

14. The laser additive manufacturing system of claim 13, wherein the build surface is a surface of a build plate or a surface of a layer of construction material.

15. The laser additive manufacturing system of claim 13, wherein the build surface is a surface of a build plate;
wherein the laser scan is a first laser scan, the spectral and intensity response information is first spectral and intensity response information, and the spatially-correlated spectral and intensity response information is spatially-correlated first spectral and intensity response information;
wherein control circuitry is further configured to:
control the laser to form a layer of construction material on the build plate;
control the laser to perform a second laser scan of the layer of construction material;
receive, from the sensor, second spectral and intensity response information of the layer of construction material captured during the second laser scan, wherein the second spectral and intensity response information is indicative of at least a temperature at a surface of the layer of construction material during the second laser scan; and
correlate the second spectral and intensity response information with spatial positioning of the laser during the second laser scan to generate spatially-correlated second spectral and intensity response information;
wherein the control circuitry is further configured to generate the spatial adjustment mask is based on the spatially-correlated first spectral and intensity response information, the spatially-correlated second spectral and intensity response information, and the target spatial intensity profile.

16. The laser additive manufacturing system of claim 13, wherein the target spatial intensity profile comprises uniform energy coupling across a build area during the additive manufacturing build operation.

17. The laser additive manufacturing system of claim 13, wherein the target spatial intensity profile comprises non-uniform, spatially tailored energy coupling across a build area during the additive manufacturing build operation.

18. The laser additive manufacturing system of claim 13, wherein the sensor is configured to capture the spectral and intensity response information within a plurality of electromagnetic spectrum wavelength bands, wherein one of the electromagnetic spectrum wavelength bands includes visible wavelengths and one of the electromagnetic spectrum wavelength bands includes infrared wavelengths.

19. The laser additive manufacturing system of claim 13, wherein the control circuitry is further configured to compare the spatial adjustment mask to a maintenance threshold and trigger an alert in response to the spatial adjustment mask exceeding the maintenance threshold.

20. An apparatus comprising laser control circuitry for implementation within a laser additive manufacturing system, the laser control circuitry being configured to:
control a laser to perform a laser scan of a building surface;
receive, from a sensor, spectral and intensity response information captured during the laser scan of the build surface, wherein the spectral and intensity response information is indicative of at least a temperature at the building surface during the laser scan;
correlate the spectral and intensity response information with spatial positioning of the laser during the laser scan to generate spatially-correlated spectral and intensity response information;
generate a spatial adjustment mask based on the spatially-correlated spectral and intensity response information and a target spatial intensity profile;
apply the spatial adjustment mask to spatially-defined laser control parameters; and
control the laser to perform an additive manufacturing build operation to construct a part, the additive manufacturing build operation being performed in accordance with the target spatial intensity profile due to application of the spatial adjustment mask.

* * * * *